(12) United States Patent
McBrearty et al.

(10) Patent No.: US 6,823,491 B1
(45) Date of Patent: *Nov. 23, 2004

(54) SYSTEM AND METHOD FOR A DYNAMICALLY INTEGRATED SEARCH ENGINE

(75) Inventors: Gerald Francis McBrearty, Austin, TX (US); Shawn Patrick Mullen, Buda, TX (US); Johnny Meng-Han Shieh, Austin, TX (US); Guha Prasad Venkataraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 09/652,051

(22) Filed: Aug. 31, 2000

(51) Int. Cl.[7] .......................... G06F 17/21; G06F 17/28
(52) U.S. Cl. ................... 715/513; 715/514; 715/507; 715/500; 715/501.1; 707/1; 707/2; 707/3; 707/4; 707/5; 345/760
(58) Field of Search ............................. 715/507, 513, 715/514, 501.1, 500; 707/1–3, 4–5; 345/760

(56) References Cited

U.S. PATENT DOCUMENTS

| | | | | |
|---|---|---|---|---|
| 5,794,259 A | * | 8/1998 | Kikinis | 715/507 |
| 5,864,845 A | * | 1/1999 | Voorhees et al. | 707/5 |
| 5,920,854 A | * | 7/1999 | Kirsch et al. | 707/3 |
| 5,987,446 A | * | 11/1999 | Corey et al. | 707/3 |
| 6,088,700 A | * | 7/2000 | Larsen et al. | 707/10 |
| 6,138,129 A | * | 10/2000 | Combs | 707/6 |
| 6,253,198 B1 | * | 6/2001 | Perkins | 707/3 |
| 6,336,116 B1 | * | 1/2002 | Brown et al. | 707/10 |
| 6,338,059 B1 | * | 1/2002 | Fields et al. | 707/4 |
| 6,480,853 B1 | * | 11/2002 | Jain | 707/10 |
| 6,661,432 B1 | * | 12/2003 | McBrearty et al. | 345/760 |

OTHER PUBLICATIONS

"Google's New GoogleScout Feature Expands Scope of Search on the Internet" Sep. 21, 1999. Google.com, http://web.archive.org/web/19991128214815/www.google.com/pressrel/ □□pressrelease4.html.*
Netscape Navigator Gold, Netscape Communications Corporation, 1996, Version 3.01 Gold.*

* cited by examiner

*Primary Examiner*—Stephen S. Hong
*Assistant Examiner*—Joshua D Campbell
(74) *Attorney, Agent, or Firm*—Joseph T. Van Leeuwen; Mark S. Walker

(57) ABSTRACT

A system and method for dynamically integrating a site specific search engine. In one embodiment, a hidden HTML tag is used on web pages to identify the site specific search engine for the web site. When a user requests a site specific search engine from the user's web browser, the HTML tag is located and the corresponding web page containing the site specific search engine is opened. In another embodiment, if the HTML tag identifying the site specific search engine is not found, an analysis of the web site's root node is made to identify a site specific search engine. If a site specific search engine is identified through the analysis, the search engine web page is opened. In yet another embodiment, if the site specific search engine is not found through either a hidden HTML tag or by analyzing the web site's root node, a generic site specific search routine is invoked. The generic site specific search receives search parameters from the user and searches web pages from the web site to compile a list of matching web pages. The list of matching web pages is then displayed to the user for further selection.

20 Claims, 8 Drawing Sheets

SYSTEM AND METHOD FOR A DYNAMICALLY INTEGRATED SEARCH ENGINE

BACKGROUND OF THE INVENTION

1. Technical Field

The present invention relates in general to a method and system for searching a computer network. More particularly, the present invention relates to an improved system and method for searching within a particular web site on the Internet.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network, such as the Internet. By linking to other computer systems, a computing device can use resources owned by another computing device. These resources can include files stored on nonvolatile storage devices and resources such as printers.

Servers perform different services for client computer systems. Web servers often provide content, or information, to client computers. Because so much information is available on the Internet, users often use a search engine to find information. The user enters a request at a search engine web site and the engine returns web pages with relevant information back to the user. A particular returned page may be buried deep within the web page owner's web site. After reviewing a returned web page, the user may wish to focus his or her searching on the web site. However, because the user may be deep within the web site, a challenge exists in finding a site-specific search engine.

Web sites often include a site-specific search engine designed to find information within the web site. Many web sites are very large with hundreds, if not thousands, of pages within the site. A site-specific search engine helps users find desired information by confining the search to the web site without searching other web sites. The user may try to find the web site's root node, often called the site's "home page" to see if a site-specific search engine is available. If the home page is found and a site-specific search engine is also found, the user can enter his or her search request and receive the corresponding results. If, on the other hand, a site specific search engine cannot easily be found, the user often ends up repetitively using a "find on this page" feature from the browser to attempt to find the desired information on various pages found within the web site.

What is needed, therefore, is a method for locating a site-specific search engine from anywhere within a web site and, alternatively, providing a generic site-specific search engine if a search engine cannot be found.

SUMMARY

It has been discovered that providing a system and method for identifying site-specific search engines increases users' efficiency and enjoyment when searching for information on the Internet. In particular, providing a hidden HTML (Hypertext Markup Language) tag that identifies a web site's search engine to a web browser running on a user's computer system. When a user requests a site-specific search engine when using the web browser software, the hidden HTML tag is located identifying the site-specific search engine. The web page containing the site-specific search engine is opened so the user can enter a search request. The hidden HTML tag identifying the site-specific search engine is placed on every web page accessible from the web site. In this manner, the site-specific search engine is identifiable from any page a user F may be viewing.

If the HTML hidden text identifying the site-specific search engine is not found on the web page, a search is made of the root node, or "home page," of the web site for a search screen. The system identifies search input fields and web pages indicative of search processing in order to locate a site-specific search engine. If a site-specific search engine is found, the web page containing the site-specific search engine is opened and displayed to the user. The user then enters' a site-specific search request and the corresponding results are returned to the user.

Finally, if a site-specific search engine cannot be located, a generic site-specific search engine is used to search the current site for the information requested by the user. The user enters the information using a search request dialog box and the web site is searched beginning with the root node of the web site and traversing through other pages within the web site in order to build a list of web pages matching the user's request. Once the list is built, it is displayed to the user and the user selects from the list to view web pages of interest.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
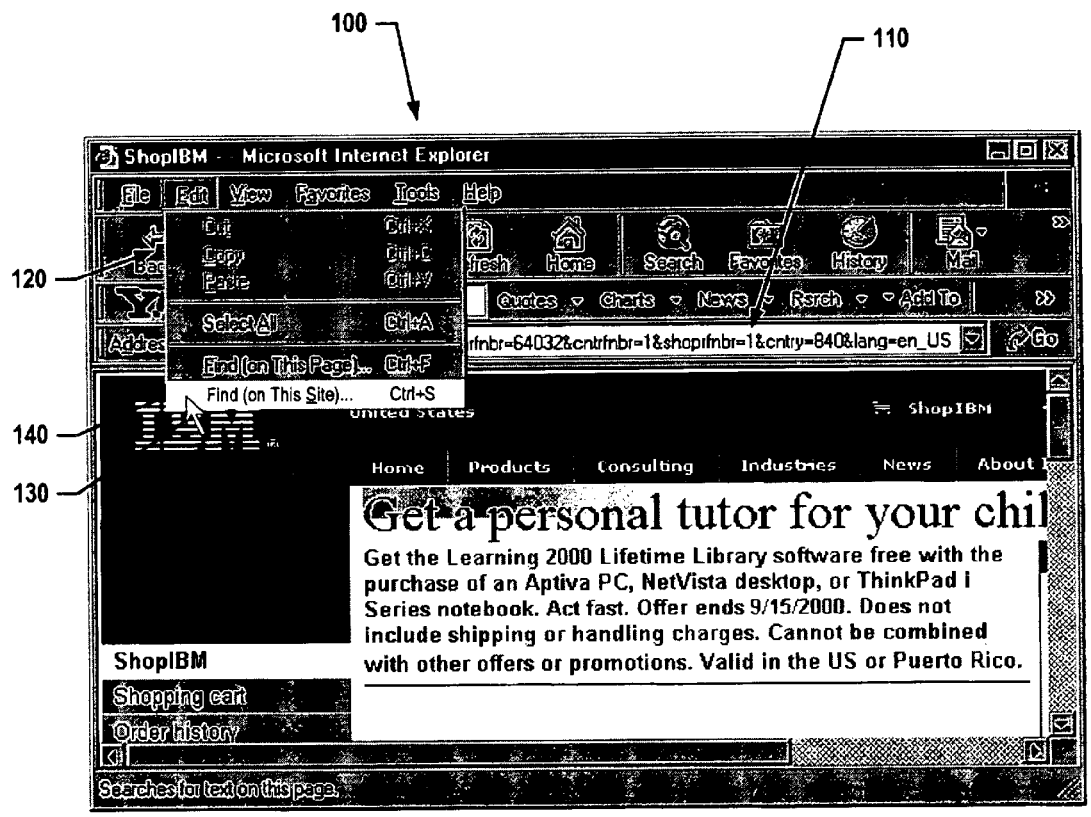
FIG. 1 is a screen diagram of a web page where the user is requesting to find further information on the web site.

FIG. 1 shows a web page displayed on web browser 100. The web browser shown is the Microsoft Internet Explorer™ web page, however other web browsers, such as Netscape Navigator™ or Mosaic™ could also be used to implement the present invention. In addition, FIG. 1 shows the present invention integrated as a selectable option from within a web browser. As will be appreciated by those skilled in the art, the present invention could also be implemented as a third-party command button or control key added to the web browser interface.

Web browser 110 includes address text box 110. Address text box 110 displays the Internet address of the web page currently being displayed by web browser 100. Address text box 110 can also be used by the user to enter an Internet address that the user wishes to open in web browser 100. The web address shown in address text box 110 is rather long because the web page being displayed is several layers from the top, or root, of the web site. One way users can navigate to lower levels is by selecting various hyperlinks from the root page (i.e., www.ibm.com). Another way users navigate to lower levels within the web site is by using a search engine. Search engines, such as AltaVista, InfoSeek, Yahoo, etc., allow the user to enter a search request. The search engine then returns web pages that appear to be relevant to the user's inquiry. For example, the user in FIG. 1 may have requested information regarding tutoring software for children.

In response the user's request, a search engine returned a hyperlink to the web page displayed in FIG. 1. When the user selected the hyperlink, the lower level web page shown in FIG. 1 is opened without traversing through the upper levels of the web site. However, because the user opened the web page using a search engine rather than traversing through the web site, the user is unaware of whether a site-specific search engine is available. If the user wants further information from the web site hosting the particular web page that was returned, the user would normally have to either traverse to the root node, or home page, for the web site and search for a site-specific web page, or would have to go to various pages and try to find the browser. The present invention, however, allows the user to directly request a search of the current web site.

When the user selects the "Edit" option from the menu within web browser 100, edit menu 120 is displayed. In addition to the familiar edit options (Cut, Copy, Paste, Select All, and Find (on this Page)), new option 140 "Find (on this Site)" has been added. The user can select new option 140 by using cursor 130 or by using the keyboard (i.e., Alt+e+s). When the user selects new option 140, program code identifies the site-specific search engine corresponding with the currently displayed web site.

Figure 2:
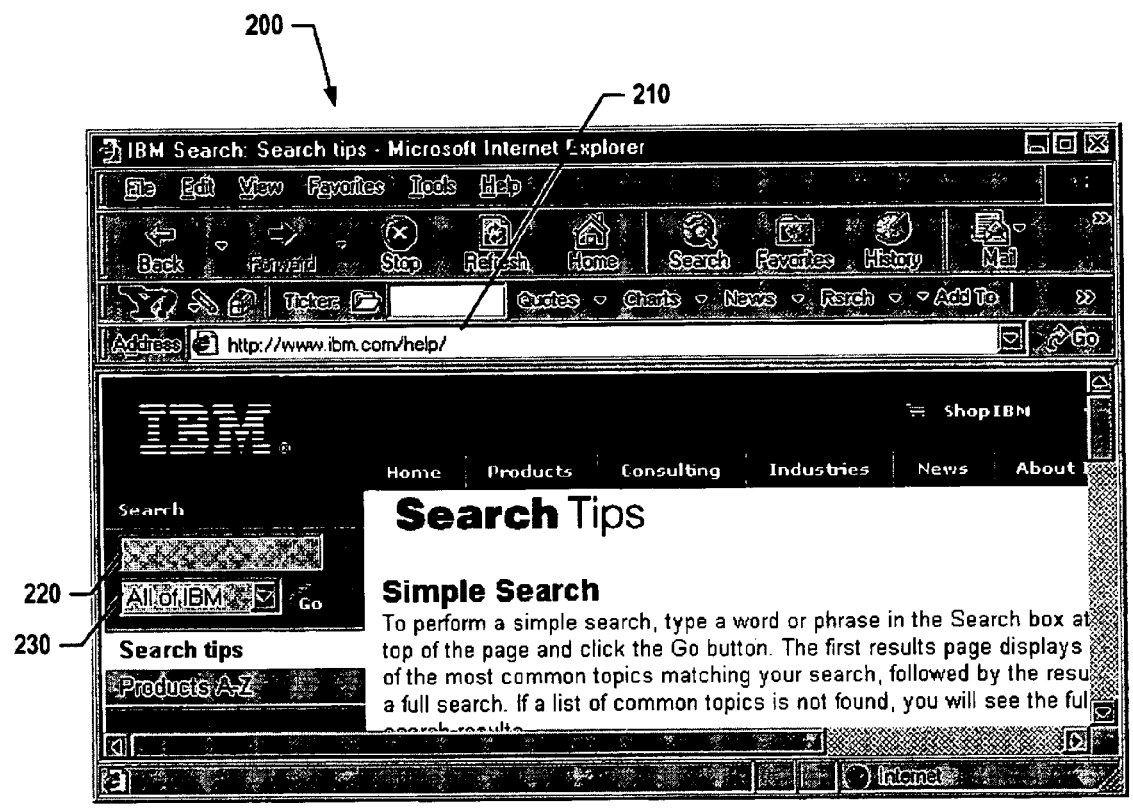
FIG. 2 is a screen diagram of a resulting site-specific web page displayed in response to the user's request.

FIG. 2 shows the responsive web page displayed when the user requested the site-specific web page from FIG. 1. Web browser 200 displays a search page that the user can use to obtain site-specific information. Address text box 210 displays the address of the search page that is being displayed in web browser 200. The site-specific search engine includes search entry text box 220 and department pull down 230. Search entry text box 220 is used by the user to enter a search request. Department pull down 230 is used to select the entire web site (the default), or to limit the searching to a particular area, or department, within the web site.

Figures 3A, 3B:
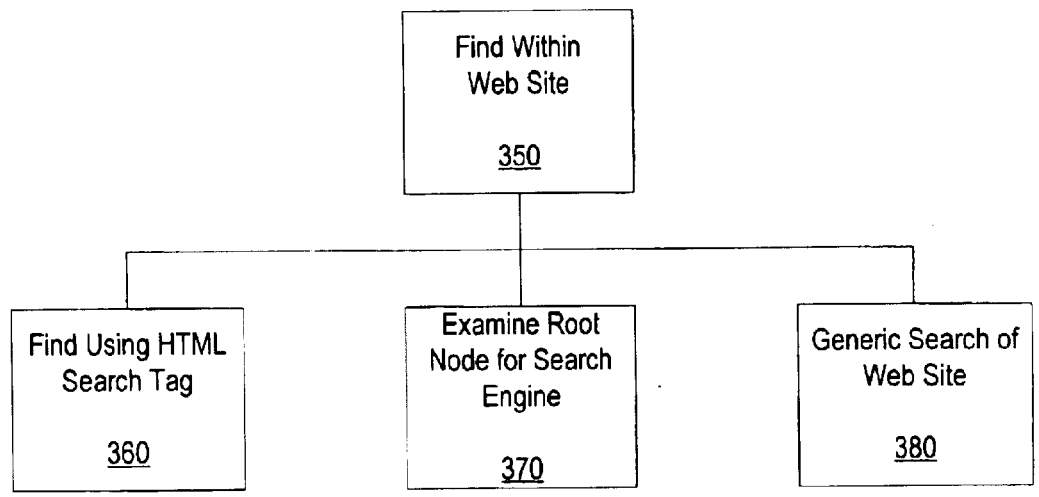
FIG. 3a is a sample HTML tag used to direct the web browser to a site-specific search-engine.
FIG. 3b is a hierarchy chart of various methods used to find information within a web site.

FIG. 3a shows HTML (Hypertext Markup Language) tag used to identify the site-specific search engine displayed in FIG. 2. HTML 300 is an excerpt from the HTML used to display the web page shown in FIG. 1. Site search HTML tag 310 is used to specify a particular site-specific web page. Site search HTML tag 310 ("<SITE SEARCH=http://www.ibm.com/help/>) indicates that the site-specific search engine for the currently-displayed web page is www.ibm.com. Site search HTML tag 310 is a hidden tag. As a hidden tag, the browser does not display anything related to the tag when the web page is displayed. However, when the user requests a site specific search engine (see FIG. 1), site search HTML tag 310 is available to the web browser and identifies the address of the site specific search engine.

FIG. 3b shows a hierarchy site for locating site specific search engine 350. First, the HTML for the current page is analyzed to determine if a site search HTML tag has been included in the HTML (source code) used to create the web page (process 360). If the site search HTML tag exists, the web page with the site specific search engine is opened using the address identified with the HTML tag. However, some web pages may not contain an HTML search tag. If an HTML search tag is not found, the root node (i.e., the web site's "home page") is analyzed to locate either (1) a search entry field on the home page, or (2) a hyperlink to a site specific web page (process 370). If either of these is found, the web page containing the site specific search engine is opened. If a site specific web page is not located using either process 360 or process 370, a generic site specific search program is launched allowing the user to enter a search request and receive matching results (process 380).

Figure 4:
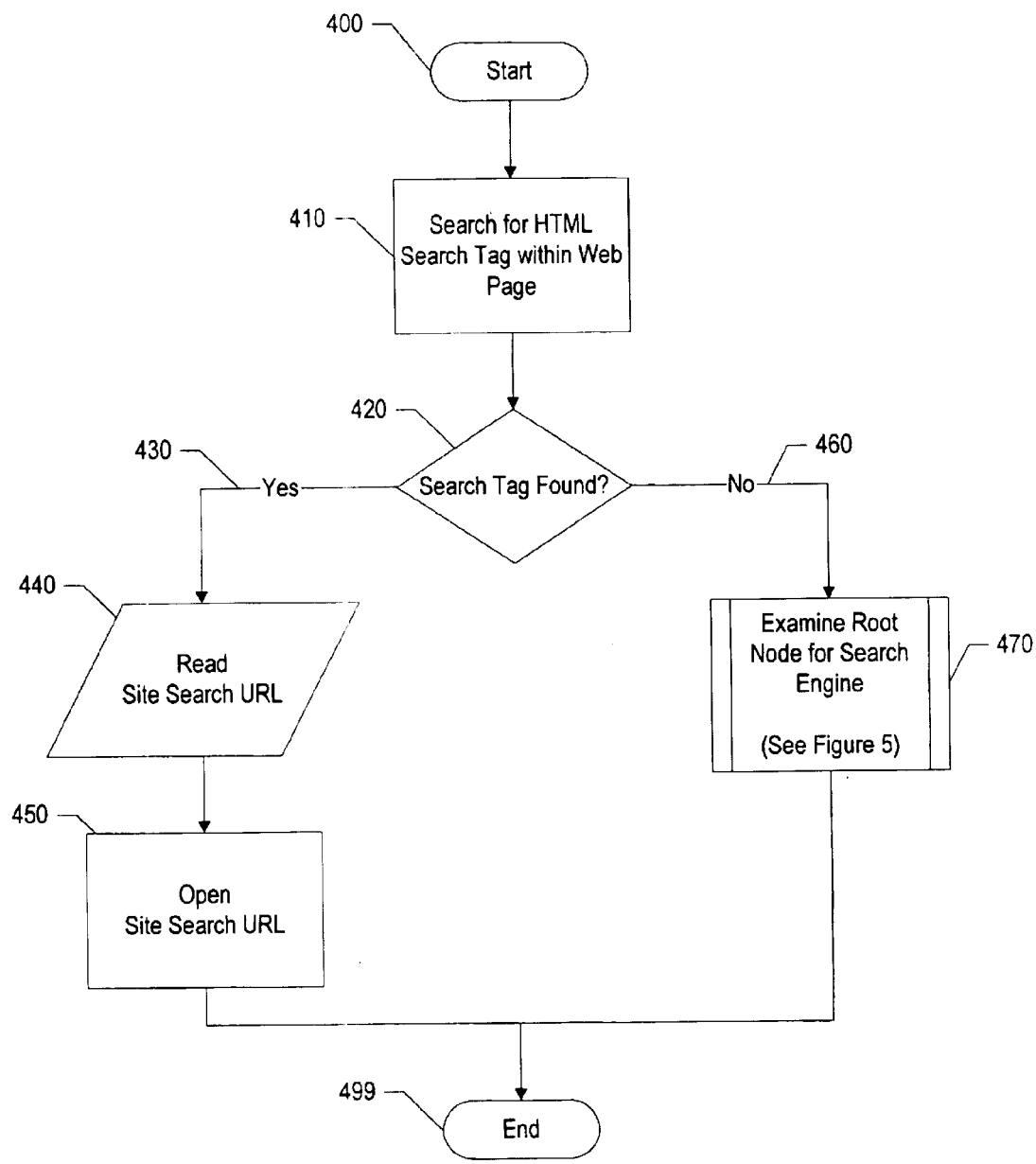
FIG. 4 is a flowchart of the web browser searching for an HTML tag identifying a site-specific search engine.

FIG. 4 shows a flowchart for one embodiment of locating the site specific search engine HTML tag (see process 360 from FIG. 3b). Commencing at step 400, the HTML, for the current web page is analyzed to locate a site specific search engine HTML tag (step 410). The program determines whether the HTML tag was located (decision 420). If the HTML tag was located, "yes" branch 430 is taken whereupon the site specific address is read (input 440) from the corresponding HTML tag (see search tag 310 in FIG. 3a for an example). The address of the site specific search engine is opened so the user can enter his or her search request (step 450).

Figure 5:
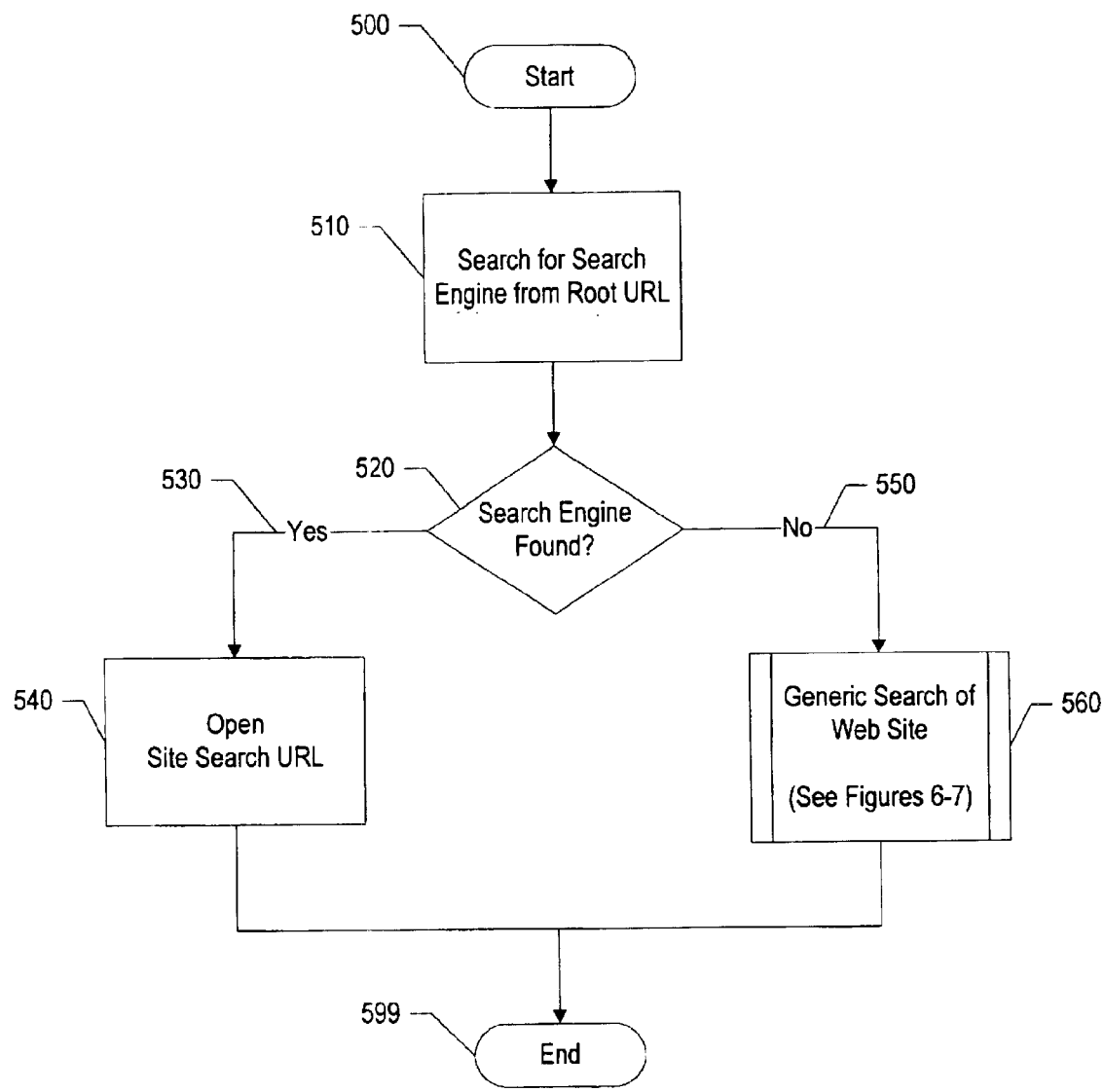
FIG. 5 is a flowchart of logic used to search for a site-specific search engine by examining the root web page within a web site.

On the other hand, if the HTML tag is not found, "no" branch 460 is taken whereupon a routine is executed to search for a site specific search string by analyzing the web site's root node (predefined process 470, see FIG. 5 for details). Processing terminates at terminator 499.

FIG. 5 shows a flowchart for analyzing the root node of the web site to identify a site specific search engine. Processing commences at step 500. The program reads the HTML corresponding with the web site's root node (step 510). The analysis searches for key words that are indicative of a site specific search engine, such as "Search this Site," "Search," etc. If a site specific search engine text entry exists on the web site's root node, the root node is identified as the site specific search engine web page. If a hyperlink is identified that points to a site specific search engine, the hyperlink address (i.e., the address of the web page corresponding to the hyperlink) is identified as the site specific search engine web page. In any event, the program determines whether a site specific search engine was identified by analyzing the web site's root node (decision 520). If a site specific search engine web page was found, "yes" branch 530 is taken whereupon the corresponding web page is opened by the user's browser (step 540). On the other hand, if a site specific search engine was not identified, a generic site specific search engine is executed (predefined process 560). The root node analysis routine terminates at termination 599.

Figure 6:
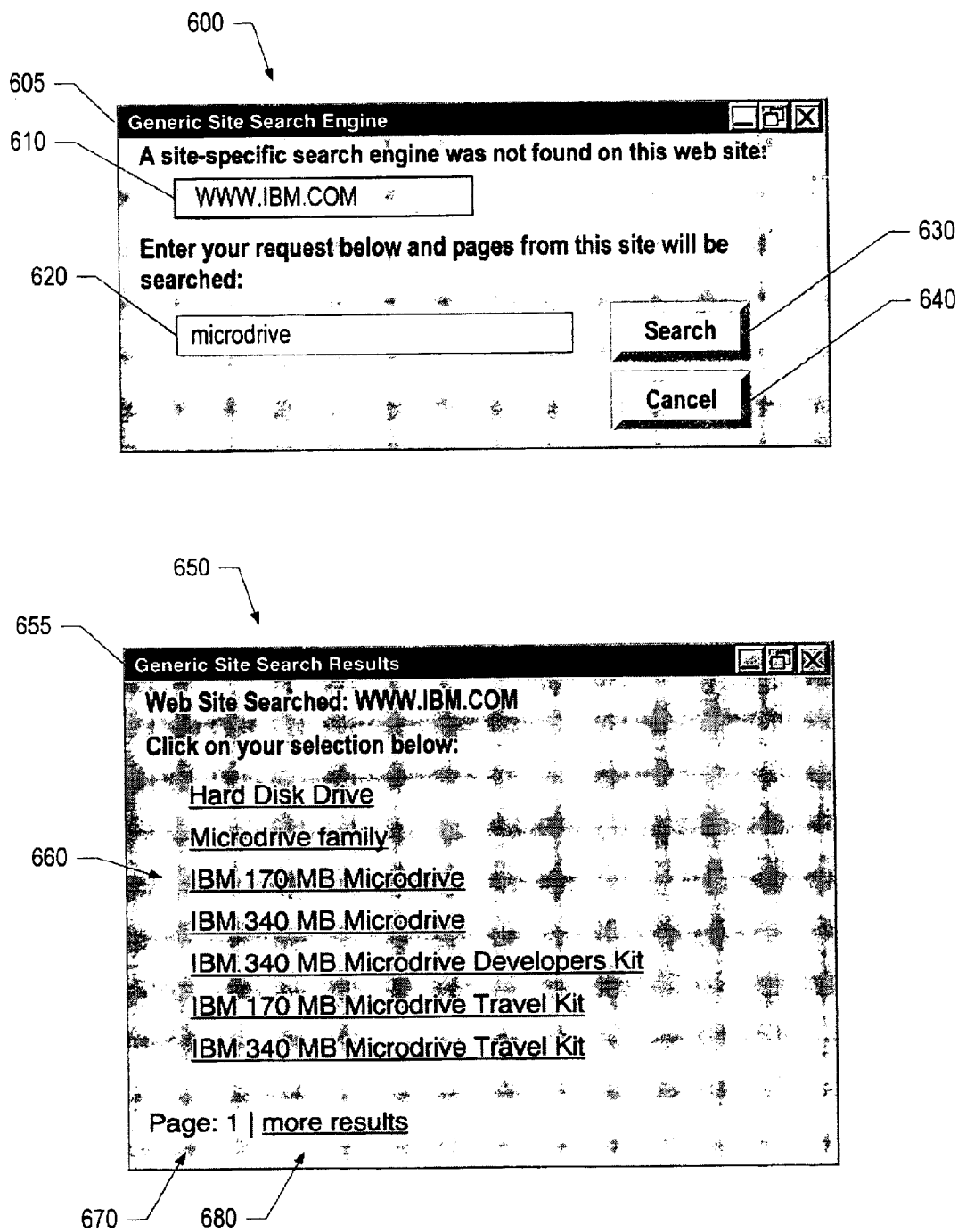
FIG. 6 is two screen displays of a generic site search engine, an input display and corresponding results display.

FIG. 6 shows two display screens used for generic searching of a web site. Input screen 600 shows an input dialog box that is displayed when a site specific search engine cannot be found. Results screen 650 shows the results of the user's search entered in input screen 600.

Input screen 600 includes title bar 605 that displays the title identifying this display screen as a generic site search engine display. Text box 610 shows the user the web site that was searched for a site specific search engine. In this example, the web site is "www.ibm.com" (even though the actual IBM web site does have a site specific search engine). The user is asked to enter their search request into text box 620. In this case, the user has requested information about "microdrive." The user can then select to perform the requested search by selecting search command button 630, or may alternatively cancel the operation by pressing cancel command button 640.

Results screen 650 shows the results from the user requesting information about "microdrive" using input screen 600. Title bar 655 indicates to the user that screen 650 contains results of the generic site search engine. The user is shown the web site that was searched ("www.ibm.com") and asked to select from list of results 660. Each item within list of results 660 is a hyperlink to the web page where matching results, also called "hits," results hyperlink 680. Hits are grouped onto one or more pages. When the user clicks more results hyperlink 680, the search engine displays the next page of results. Results can be ordered according to where the results were found. For example, results that include the matching term entered by the user into text box 620 on web page title can be shown first, while those results where the search term was found in the body of the web document can be shown after the first set of result. In this way, results that are likely to be more relevant can be shown first to the user. In one embodiment, results screen 650 is divided into pages of results so that the user can view result pages before all results have been gathered by the search engine.

Figure 7:
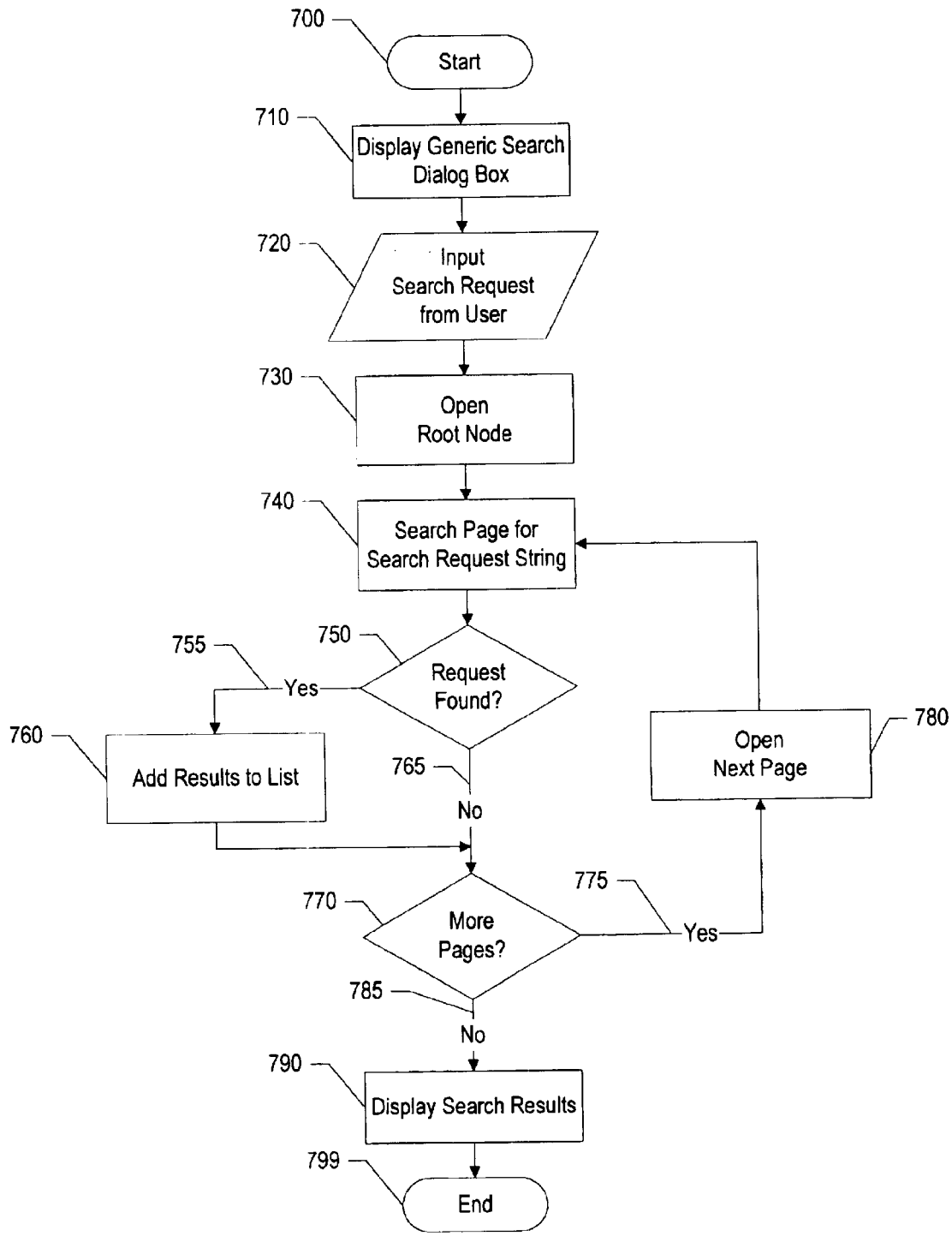
FIG. 7 is a flowchart of logic used to generate a generic site-specific search result.

FIG. 7 shows a flowchart for a generic site specific search engine that is invoked if a site specific search engine web page cannot be found. Processing commences at step 700 whereupon a generic search dialog box is displayed to the user (step 710). The user uses text boxes on the dialog box to enter a search request (input 720). The searching begins at the root node (step 730). The web page corresponding to the root node is searched (step 740) to identify matches with the search request input by the user. Matches may be found in the source HTML comprising the document as either text entries or hypertext addresses. For example, if the user was searching for information about "microdrives," the term "microdrive" may be found on a web page amongst data describing microdrive devices and hyperlinks containing the term "microdrive" may also be found devoting entire pages of information to the subject. If the information is found within a hypertext address, the hypertext data is added to the list (see step 760), whereas if the matching data was simply found on the current page, the current web page address (i.e., "Hard Disk Drives") is added to the list. If matches were found on the web page, decision 750 branches to "yes" branch 755 whereupon the matching results are added to a list (step 760) that will be displayed to the user. If no matches were found on the web page, "no" branch 765 is taken and no matches are added to the list. If more web pages exist on the web site, decision 770 branches to "yes" branch 775 whereupon the next web page is opened (step 780) and processing loops back to searching the current web page for the requested search string (step 740). This looping is continued until all web pages have been processed.

On the other hand, if no more web pages exist to be searched, decision 770 branches to "no" branch 785. The search results that were added to the list are displayed to the user (step 790). The user can then select from the search results list to open web pages that may be of interest. The generic site specific search engine processing ends at termination 799.

Figure 8:
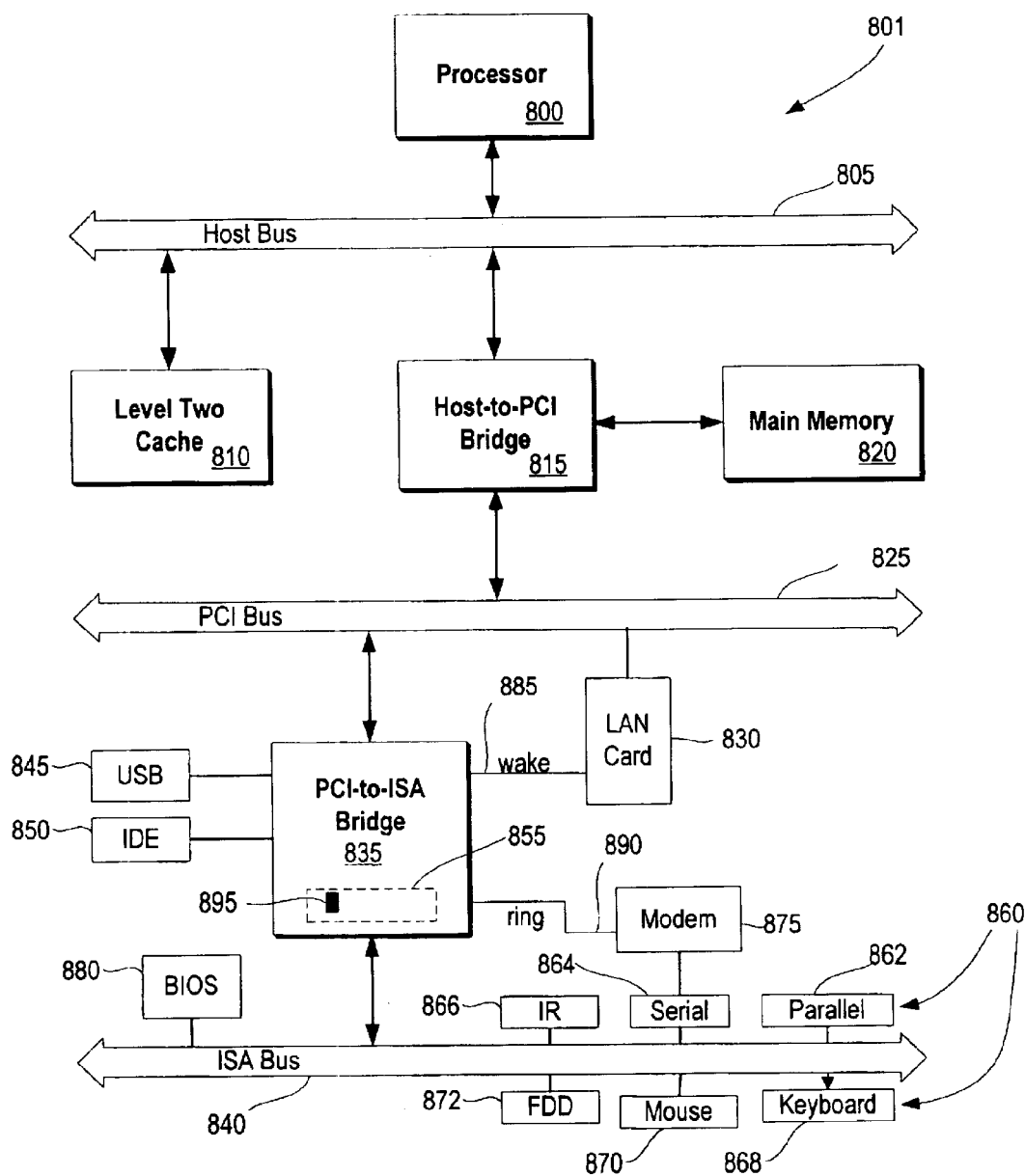
FIG. 8 is a block diagram of an information handling system capable of implementing the present invention.

FIG. 8 illustrates information handling system 801 which is a simplified example of a computer system capable of performing the present invention. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the Internet search processes described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for identifying a search engine, said method comprising:
    searching a web page for a hidden search engine identifier;
    analyzing a root node of a web site for a search entry field, wherein the web site includes the web page and wherein the analyzing is in response to the searching failing to find the search engine identifier; and
    opening a web page containing the search entry field.

2. The method as described in claim 1 further comprising:
    opening a second web page corresponding to the search engine identifier.

3. The method as described in claim 1 further comprising:
    displaying a search entry screen in response to the searching failing to find the search engine identifier;
    receiving a search request from the user;
    searching a plurality of pages from a web site for the search request, wherein the web site contains the web page; and
    providing a selectable search result screen in response to searching the plurality of pages.

4. The method as described in claim 1 further comprising:
    identifying a hidden HTML tag within the web page, wherein the hidden HTML tag includes the search engine identifier.

5. The method as described in claim 1 further comprising:
    receiving a request from the user, wherein the receiving further includes selecting a menu option from a web browser window.

6. The method as described in claim 1 further comprising:
    displaying a search entry screen in response to the analyzing failing to find the search entry field;
    receiving a search request from the user;
    searching a plurality of pages from the web site for the search request; and
    providing a selectable search result screen in response to searching the plurality of pages.

7. A method of providing search capability to a web page devoid of said search capability, the web page being at least one of a plurality of web pages of a web site, said method comprising:
    determining that the web site does not have an associated search engine;
    analyzing a root node of the web site for a search entry field in response to the determination, wherein the web site includes the web page;
    opening a web page containing the search entry field; and
    allowing access to the search engine from the web page.

8. The method as described in claim 7 further comprising:
    accessing the search engine.

9. The method as described in claim 7 further comprising:
    displaying an input screen;
    receiving a search request; and
    sending the search request to the search engine.

10. The method as described in claim 7 further comprising:
    locating a search engine identifier corresponding to the search engine.

11. The method as described in claim 9 wherein the search engine identifier is included in a hidden HTML tag corresponding to the web page.

12. The method as described in claim 7 wherein the allowing further includes opening a second web page, wherein the second web page corresponding to the search engine.

13. An information handling system comprising:
    one or more processors;
    a memory accessible by the processors;
    a nonvolatile storage device accessible by the processors;
    a network interface connecting the information handling system to a computer network; and
    a search engine location tool, the search engine location tool including:
        means for receiving a request from a user;
        means for searching a web page for a search engine identifier;
        means for analyzing a root node of a web site for a search entry field, wherein the web site includes the web pare and wherein the analyzing is in response to the searching failing to find the search engine identifier; and
        means for opening a web page corresponding to the search engine identifier.

14. The information handling system as described in claim 13 wherein the search engine location tool further includes:

means for displaying a search entry screen in response to the searching failing to find the search engine identifier;

means for receiving a search request from the user;

means for searching a plurality of pages from a web site for the search request, wherein the web site contains the web page; and means for providing a selectable search result screen in response to searching the plurality of pages.

15. The information handling system as described in claim by 13 wherein the search engine location tool further includes:

means for identifying a hidden HTML tag within the web page, wherein the hidden HTML tag includes the search engine identifier.

16. The information handling system as described in claim 13 wherein the search engine location tool further includes:

means for analyzing one or more web pages of a web site for a search entry field, wherein the web site includes the web page and wherein the analyzing is in response to the searching failing to find the search engine identifier;

means for opening a web page containing the search entry field;

means for displaying a search entry screen in response to the analysis failing to find the search entry field;

means for receiving a search request from the user;

means for searching a plurality of pages from the web site for the search request; and means for providing a selectable search result screen in response to searching the plurality of pages.

17. A computer program product for identifying a search engine, said computer program product comprising:

means for receiving a request from a user;

means for searching a web page for a search engine identifier;

means for analyzing a root node of a web site for a search entry field, wherein the web site includes the web base and wherein the means for analyzing is performed in response to the means for searching failing to find the search engine identifier; and means for opening a web page corresponding to the search engine identifier.

18. The computer program product as described in claim 17 further comprising:

means for displaying a search entry screen in response to the searching failing to find the search engine identifier; and means for providing a selectable search result screen in response to searching the plurality of pages.

19. The computer program product as described in claim 17 further comprising:

means for identifying a hidden HTML tag within the web page, wherein the hidden RTML tag includes the search engine identifier.

20. The computer program product as described in claim 17 further comprising:

means for analyzing one or more web pages of a web site for a search entry field, wherein the web site includes the web page and wherein the means for analyzing is performed in response to the means for searching failing to find the search engine identifier;

means for opening a web page containing the search entry field;

means for displaying a search entry screen in response to the analysis failing to find the search entry field;

means for receiving a search request from the user;

means for searching a plurality of pages from the web site for the search request; and means for providing a selectable search result screen in response to searching the plurality of pages.

* * * * *

UNITED STATES PATENT AND TRADEMARK OFFICE
CERTIFICATE OF CORRECTION

PATENT NO. : 6,823,491 B1
DATED : November 23, 2004
INVENTOR(S) : McBrearty et al.

It is certified that error appears in the above-identified patent and that said Letters Patent is hereby corrected as shown below:

Column 8,
Line 63, please delete "pare" and insert -- page --.

Column 9,
Line 14, please delete "claim by" and insert -- claim --.

Column 10,
Line 2, please delete "base" and insert -- page --.
Line 21, please delete "RTML" and insert -- HTML --.

Signed and Sealed this

Twenty-sixth Day of April, 2005

JON W. DUDAS
*Director of the United States Patent and Trademark Office*